USOO5744651A

United States Patent [19]
Marchionni et al.

[11] Patent Number: 5,744,651
[45] Date of Patent: Apr. 28, 1998

[54] PROCESS FOR PREPARING PEROXIDIC PERFLUOROPOLYOXYALKYLENES

[75] Inventors: Giuseppe Marchionni, Milan; Pier Antonio Guarda, Nole, both of Italy

[73] Assignee: Ausimont S.p.A., Milan, Italy

[21] Appl. No.: 800,022

[22] Filed: Feb. 13, 1997

[30] Foreign Application Priority Data

Feb. 14, 1996 [IT] Italy ............... MI96 A 000279

[51] Int. Cl.$^6$ ................................ C07C 409/20
[52] U.S. Cl. ............... 568/560; 568/561; 568/565
[58] Field of Search ................ 568/560, 561, 568/565

[56] References Cited

U.S. PATENT DOCUMENTS

| | | |
|---|---|---|
| 3,715,378 | 2/1973 | Sianesi et al. . |
| 3,847,978 | 11/1974 | Sianesi et al. . |
| 4,451,646 | 5/1984 | Sianesi et al. . |
| 5,149,842 | 9/1992 | Sianesi ............... 549/550 |
| 5,182,342 | 1/1993 | Feiring et al. . |
| 5,354,922 | 10/1994 | Marchionni et al. . |
| 5,488,181 | 1/1996 | Marchionni ............... 568/615 |

FOREIGN PATENT DOCUMENTS

| | | |
|---|---|---|
| 393700 | 10/1990 | European Pat. Off. . |
| 393705 | 10/1990 | European Pat. Off. . |
| 654493 | 5/1995 | European Pat. Off. . |
| 695775 | 2/1996 | European Pat. Off. . |
| 9532173 | 11/1995 | WIPO . |
| 9532174 | 11/1995 | WIPO . |

OTHER PUBLICATIONS

"Comparative Studies of the Catalytic Fluorination of Carbon Monoxide with Elementary Fluorine" *Journal of the American Chemical Society*, 91:16, pp. 4432–4436, Jul. 30, 1969.

*Primary Examiner*—Alan L. Rotman
*Assistant Examiner*—Jean F. Vollano
*Attorney, Agent, or Firm*—Watson Cole Stevens Davis, P.L.L.C.

[57] ABSTRACT

Tetrafluoroethylene oxidation process at temperatures comprised between −100° C. and −40° C., in absence of Uv radiations, and by operating in the presence of a chemical initiator containing at least one F—X bond, wherein X is oxygen or halogen, in the presence of a solvent comprising an amount of $COF_2$ higher than 8% by moles.

15 Claims, No Drawings

PROCESS FOR PREPARING PEROXIDIC PERFLUOROPOLYOXYALKYLENES

The present invention relates to a process for preparing peroxidic perfluoropolyoxyalkylenes, usually called peroxidic perfluoropolyether.

More particularly, it relates to a process for preparing peroxidic perfluoropolyethers obtained by oxidation of tetrafluoroethylene in the presence of solvents.

As known, peroxidic perfluoropolyethers are used as initiators of radicalic polymerizations and as curing agents for polymers. They can be transformed into inert perfluoropolyethers, i.e. devoid of peroxidic groups and reactive terminal groups, which are used as inert fluids in various applications: "testing" in electronics, vapour and liquid phase soldering, projection of building materials, lubrication, etc. Moreover, functional perfluoropolyethers, used for instance as intermediates for polymers, can be obtained from peroxidic perfluoropolyethers by means of known techniques of chemical reduction.

According to the prior art, peroxidic perfluoropolyethers are prepared by reaction of perfluoroolefins with oxygen under the action of ultraviolet radiations. See for instance U.S. Pat. No. 4,451,646, U.S. Pat. No. 5,354,922, U.S. Pat. No. 3,847,978 and U.S. Pat. No. 3,715,378.

It is also known to carry out the reaction between tetrafluoroethylene and oxygen without using ultraviolet radiations, provided that a substance acting as polymerization initiator is present, said compound having one or more F—X bonds, wherein X is chosen from O and halogen. For instance fluorine and hypofluorites up to 3 carbon atoms can be mentioned. See patents EP 0393700 and EP 0393705. According to the process described in these patents, by increasing the ratio between the amounts of monomer and initiator fed in the process, products with rising molecular weight are obtained. It has been noticed, however, that at the same time the content of peroxidic oxygen increases over the limit of acceptability, estimable around a peroxidic power value (PO), defined as grams of peroxidic oxygen per 100 g of product, equal to about almost reaching the danger point set around 4.5–5. Perfluoropolyether products having number average molecular weight higher than about 5000 and contemporaneously with a PO value lower than the maximum acceptability limit above mentioned cannot be obtained in the absence of ultraviolet radiation.

It is to be noticed that the problem of the molecular weight control and of the PO does not exist in the processes of perfluoroolefins photooxidation. It is indeed known that in the processes using ultraviolet radiations it is possible to obtain perfluoropolyethers with both molecular weight and PO independently controlled from each other. In particular peroxidic perfluoropolyethers with sufficiently high molecular weights and controlled PO can be obtained. Such polymers can be used for obtaining derivatives with a good functionality value ($f \geq 1.7$), said functional derivatives being obtainable by chemical reduction and with molecular weight high enough to be of industrial interest.

Photooxidation processes have however the drawback due to the fact that their productivity is bound to the radiant power of the lamp. Therefore this implies high costs plants.

The oxidative process of the perfluoroolefins in the absence of UV radiations allows instead a high productivity and lower plant costs, but, as already said before, does not allow a simultaneous control of PO and of the molecular weight of the peroxidic perfluoropolyether and therefore of the characteristics of the functional derivatives obtainable therefrom.

From a previous European patent application in the name of the Applicant, 94117844.4, it is known that it is possible to utilize the oxidation process in the absence of radiations to obtain peroxidic perfluoropolyethers having high molecular weight and at the same mime a controlled PO, by operating under pressure and with a molar ratio TFE/ chemical initiator (for instance $F_2$, higher than 33. In practice, by operating under pressure, in the absence of UV radiations, polymers having a lower number of peroxidic units are obtained, the other conditions being equal it is thus possible to further increase the olefin flow-rate/ initiator flow-rate ratio to increase the content of peroxidic units up to the extent obtainable at room pressure, with the final result to synthesize under pressure a polymer with higher molecular weight, the content of peroxidic units being equal, with respect to that obtainable at room pressure. It is therefore possible by operating at higher pressure to obtain polymers with average molecular weight higher and higher, the PO being equal. This fact is highly desirable for the reasons described in detail in the same European patent application EP 94117844.4 incorporated herein by reference, i.e. to be able to obtain functional derivatives (by chemical reduction of the peroxidic crude product) having a higher functionality, the molecular weight being equal.

The Applicant has unexpectedly and surprisingly found that it is possible to obtain peroxidic perfluoropolyethers having higher molecular weights, the PO being equal, by operating at the same temperature and working pressure of the former patent application mentioned above if one operates in the presence of a specific compound as defined hereunder. This allows moreover to obtain products similar to those obtainable at higher pressures, by operating at lower pressures, with all plant and safety advantages involved.

An object of the present invention is a tetrafluoroethylene oxidation process at temperatures comprised between $-100°$ C. and $-40°$ C., preferably $-90°$ and $-60°$ C., in the absence of UV radiations and by operating in the presence of a chemical initiator containing at least one F—X bond, wherein X is oxygen or halogen, by operating with total pressures comprised between 0 and 15 relative bar and in the presence of a solvent comprising an amount of $COF_2$ higher than 8% by moles or in the presence of $COF_2$ alone. When X is oxygen, the F—X bonding is F—O—.

The chemical initiator is described in patent applications EP 393700 and EP 393705, incorporated herein by reference.

Preferably the chemical initiator is selected in the group formed by fluorine and by alkylic hypofluorites containing up to 3 carbon atoms.

The process of the present invention is carried out by feeding in the liquid phase, initially constituted by the solvent, a gaseous flow of oxygen and a gaseous flow of chemical initiator and a gaseous flow of tetrafluoroethylene. Sometimes also an inert gas, optionally mixed with the chemical initiator or with oxygen, is fed in the liquid phase. The inert gas, if used, is preferably selected from nitrogen, argon, helium, $COF_4$ and $C_2F_6$. A particular case of the use of nitrogen as inert gas is given by the use of air instead of oxygen.

The solvents utilized are those commonly indicated in the art for the TFE oxidation at low temperature, provided that they are liquid in the reaction conditions of the present invention.

The solvent is preferably selected from linear and cyclic fluorocarbons, optionally containing hydrogen and/or chlorine. Examples of preferred solvents are: $CFCl_3$, $CF_2Cl_2$, $CF_2HCl$, $CF_3$—$CF_2H$, $COF_2$ —$CFH_2$, $CF_2H$—$CF_2H$, CHClF—CF$_3$ and/or CHF$_2$—CClF$_2$ optionally in admixture with CHF$_2$—CH$_2$F, CF$_3$CFHCF$_2$CF$_3$, CF$_3$CFHCFHCF$_2$CF$_3$. Azeotropic or near-azeotropic mixtures of two or more of the mentioned compounds can also be employed. Other utilizable solvents are perfluoropropane, perfluorocyclobutane, perfluorocyclohexane, chloropentafluoroethane, 1,1,2-trichloro-1,2,2-trifluoroethane, 1,2-dichlorotetrafluoroethane. Also perfluoroamines and perfluoroethers and polyether, optionally containing hydrogen, can be used as solvent. Examples of this type are: CH$_3$OCF$_2$CFHCF$_3$, C$_8$F$_{17}$—O—C$_2$F$_4$H, CF$_2$H—O—CF$_2$H, C$_6$F$_{13}$—O—C$_2$F$_4$O—CF$_2$H, C$_8$F$_{17}$—O—CF$_2$H, C$_7$F$_{15}$—O—C$_2$F$_4$H, C$_4$F$_9$—O—C$_2$F$_4$H, C$_4$F$_9$OCH$_3$, C$_4$F$_9$OC$_2$H$_5$, C$_3$F$_7$OCH$_3$, C$_3$F$_7$OC$_2$H$_5$, C$_2$F$_5$OCH$_3$, C$_2$F$_5$OC$_2$H$_5$, F(CF$_2$—CF$_2$—CX'$_2$O)$_n$CF$_2$CF$_2$H with X'=F, H and n being an integer from 0 to 4, extremes included, and T—O(C$_3$F$_6$O)$_{p0}$(C$_2$F$_4$O)$_{p0}$(CF$_2$O)$_{r0}$—T' with p0, q0 and r0 being integers from 0 to 3, extremes included, and T and T', equal to or different from each other, selected from CF$_3$, C$_2$F$_5$, C$_3$F$_7$, CF$_2$H and CF$_3$CFH, CF$_2$CF$_2$H, the perfluorooxyalkylenic units being randomly distributed in the polymeric chain. Examples of known solvents are mentioned for instance in U.S. Pat. No. 3,715,378, U.S. Pat. No. 4,451,646, U.S. Pat. No. 5,182,342. Other examples of solvents are indicated in WO 95/32174 and WO 95/32173 incorporated herein by reference. The choice of the solvent can affect the working conditions of the process which, however, can be easily fixed by a skilled person. The solvents which do not act as chain transfer agent are preferred.

The room pressure can be utilized or it is possible to operate under pressure as already indicated.

The chemical initiator, for instance fluorine, is fed in the liquid phase in amounts generally comprised between 0.001 and 0.1 by moles per hour per liter of liquid phase.

The TFE concentration in liquid phase generally ranges from 0.005 to 1 mole/l of solution, preferably from 0.01 to 0.5 moles/l.

The process can be carried out both in a discontinuous and, preferably, in a continuous way.

The feeding molar ratios TFE/chemical initiator are generally comprised between 10 and 200, preferably between 40–120.

The essential component of the present invention, COF$_2$, is prepared according to well known methods of the literature, see for instance journal American Chemical Society, Jul. 30, 1969, p. 4432–4436 M. Wechsberg and G. H. Cady.

Preferably the amount by moles of COF$_2$, when it is in admixture with the solvent, is comprised between 15 and 60%.

By the process of the present invention a peroxidic perfluoropolyether is obtained having a lower PO than when one operates under the same temperature, reactants flow-rates (TFE and initiator), pressure conditions, but in the absence or in the presence of limited amounts of COF$_2$ in the reaction phase, outside the lower limit of the present invention. It is therefore possible to increase the ratio between olefin and initiator feeding so as to obtain a polymer with a PO equal to that obtained in the solvent not containing COF$_2$ or containing an amount by moles of COF$_2$ lower than the values of the present invention. The obtained result is therefore a polymer with higher molecular weight and PO equal to that obtainable in a solvent without COF$_2$, the other reaction conditions, such as temperature, pressure, reactor configuration and volume, being equal.

It has been found by the Applicant that a method to obtain COF$_2$ resides in recycling COF$_2$ formed as reaction by-product in the oxidation reaction up to the obtainment of the concentrations indicated above. By operating with a continuous plant, the obtained peroxidic polymer is extracted and the COF$_2$ is concentrated in the solvent up to the desired values.

In the processes of the art when one operates in a continuous way, the solvent and the unreacted perfluoroolefins are recycled after separation of the reaction-by-products. Unexpectedly the Applicant has found that one of the reaction by-products, COF$_2$, can be utilized according to the present invention to obtain the results described hereunder.

The peroxidic polymers obtained have the following general formula:

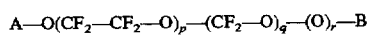

$$A-O(CF_2-CF_2-O)_p-(CF_2-O)_q-(O)_r-B$$

wherein the terminals A and B can be equal to or different from each other and comprise —CF$_2$X, —CF$_2$—CF$_2$X wherein X indicates a radical group deriving from the type of initiator utilized; the p, q and r indexes equal to or different from each other are integers, the sum p+q is an integer comprised from 2 to 1000, preferably from 10 to 500, the p/q ratio is comprised between 0.1 and 40, preferably between 0.2 and 20, the r/(p+q) is comprised between 0.01–0.3 and however is such as to bring to a peroxidic perfluoropolyether having a PO lower than 5, preferably lower than 4, generally comprised between 1 and 3.5. The PO value is expressed as grams of active oxygen (16 amu) (atomic mass unit) per 100 grams of polymer.

The amount of oxygen utilized is sufficient to saturate the solution, generally one operates with an excess of oxygen with respect to TFE.

The peroxidic perfluoropolyethers can be then transformed into products without peroxidic oxygen by means of a thermal treatment at temperatures generally comprised between 100°–250° C. or by UV radiations, in the presence or not of solvents. The so obtained product can be submitted to fluorination treatment to obtain the perfluoropolyether with perfluoroalkylic terminals.

Alternatively the peroxidic crude product can be submitted to chemical reduction and to subsequent transformation reactions to obtain functional products. See for instance U.S. Pat. No. 3,715,378. The chemical reduction is for instance carried out according to the methods described in patents U.S. Pat. Nos. 4,451,646, 3,847,978. The so obtained derivative in the form of carboxylic acid salt can be submitted to decarboxylation processes in the presence of hydrogen-donor substances, among which glycols, water, etc. to obtain perfluoropolyethers having both terminals —OCF$_2$H. See for instance European patent application 95111906.4 in the name of the Applicant.

The following examples are given for illustrative purposes and are not limitative of the present invention.

EXAMPLE 1

Example 1A (comparative)

20 l of dichlorodifluoromethane (R-12) are introduced in an AISI reactor, with a capacity of about 25 l, equipped with a magnetic stirrer and gas feeding pipes, cooled at −80° C. 400 Nl/h of oxygen are fed under flow and the reactor is pressurized (by means of a control-valve put on the gaseous flow flowing out from the reactor) at the pressure of 4.0 absolute bar. A tetrafluoroethylene (TFE) flow equal to 224 Nl/h and a fluorine flow equal to 4.6 Nl/h (molar ratio TFE/F$_2$=48.7) are then fed, by maintaining the reactor under stirring at the temperature of −80° C. and at the pressure of 4.0 absolute bar for the whole test. The composition of the reaction mixture (except the dissolved polymer) is evaluated by gaschromatographic analysis; the percentage of dissolved polymer is evaluated by gravimetry on a sample of drawn mixture, after distillation of the solvent and of the by-products. The gaschromatografic analysis allows then to determine the relative percentage of solvent (dichlorodifluoromethane), of dissolved oxygen, of the reaction by-products ($C_2F_6$, $COF_2$, $C_2F_4O$) and of tetrafluoroethylene, the tetrafluoroethytene concentration is an index of the reaction conversion. The reaction time in Ex. 1A was 3 hours.

Example 1B (comparative)

After 3 hours of reaction one starts to continuously run the plant of Ex. 1A: a flow of reaction mixture is extracted continuously from the reactor and sent to an evaporator, in which solvent and by-products are evaporated leaving the polymer which is continuously extracted. In this way the polymer concentration was kept constant for the whole test and equal to about 6% by weight. The solvent is separated by distillation of the by-products and recycled into the reactor. The reaction mime in Ex. 1B was 2 hours.

Example 1C (comparative)

After a total reaction time of 5 hours (always from the beginning of the reaction, i.e. 3 hours+2 hours) the $COF_2$ separated from the solvent instead of being eliminated as by-product, is condensed and added to the solvent and recycled in the reactor. From this moment the solvent is charged with $COF_2$ produced and recycled in the reactor. The reaction time in Ex. 1C was 7 hours.

Example 1D (comparative)

After about 12 total hours of working the drawn polymer showed a content of peroxidic units (PO, expressed as g of active oxygen per 100 g of polymer) equal to 3.2. The reaction time in Ex. 1D was 6 hours.

Example 1E (comparative)

After 18 total hours of working the PO was equal to 2.97 and the $^{19}$F-NMR analysis indicated an average molecular weight equal to 6350 and a p/q ratio=5.14 (the molecular weight determined by $^{19}$F-NMR analysis is a number average Mw).

At such running time the gaschromatographic analysis of the reaction mixture gave a molar percentage of $COF_2$ of 7%, of $C_2F_6$ of 0.3%, of $C_2F_4O$ of 0.4% and of tetrafluoroethylene of 0.40%. The reaction time in Ex. 1E was 25 hours.

Example 1F

After 43 total hours of running the molar percentage of $COF_2$ resulted equal to 16% ($C_2F_6$=0.3%, $C_2F_4O$=0.5%, TFE=0.13%); the drawn polymer showed a PO of 1.51 and a number average molecular weight of 6150 with p/q ratio=2.07. The reaction time in Ex. 1F was 3 hours.

Example 1G

After 46 hours, the TFE concentration was no longer gaschromatografically detectable. At 67 hours of running the reaction mixture analysis showed a content in $COF_2$ equal to 50% ($C_2F_4O$=0.2%, TFE=0%) and the drawn polymer had a PO equal to 0.36 and a number average molecular weight of 5600 with p/q ratio=0.09. The reaction time in Ex. 1G was 26 hours.

Example 1H

After 72 hours of running the fluorine flow-rate was reduced to 3.55 Nl/h, rising thus the TFE/$F_2$ ratio to 63. In the following running hours, the content of $COF_2$ in the reaction mixture remained nearly constant around 55% by moles. Shortly afterwards the variation of the flow-rates, the TFE concentration was measurable again, around 0.3% molar. The polymer drawn after 76 total hours of running had a PO of 1.44 and a number average molecular weight of 7800 with p/q ratio of 1.45.

EXAMPLE 2

By utilizing the plant of Example 1, 20 l of dichlorodifluoromethane are introduced in the reactor at the temperature of −80° C. With the same procedure of that utilized in example 1, 600 Nl/h of oxygen, 336 Nl/h of tetrafluoroethylene (TFE) and 8.4 Nl/h of fluorine (TFE/$F_2$=40 molar ratio) are fed by maintaining the temperature of the reactor at −80° C. and the pressure at 4 absolute bar. After some hours of running one starts to extract a flow of reaction mixture which is sent to the evaporator, by recycling solvent and $COF_2$ and extracting the polymer so as to maintain constant around 7% by weight the polymer concentration in the reactor.

In these conditions of running the tetrafluoroethylene concentration is not detectable by gaschromatographic analysis and $COF_2$ accumulates in the time.

After 26 hours of running the $COF_2$ concentration in the reaction mixture is 45% molar. At this point the reactants flow-rates are set as follows: oxygen=400 Nl/h, tetrafluoroethylene (TFE)=224 Nl/h, fluorine=3.4 Nl/h, (TFE/$F_2$=66 ratio). The plant is then carried out so as to maintain constant the $COF_2$ (around 47% molar) in the successive running hours, by recycling in the solvent only part of the $COF_2$ produced. The tetrafluoroethylene concentration quickly reaches the value of 0.6% molar and maintains constant for the rest of the running.

A sample of the polymer extracted after 39 total hours of running shows a PO of 3.68, a number average molecular weight of 8700 amu with p/q ratio=7.74.

EXAMPLE 3

By utilizing the plan5 of Example 1, 20 l of dichlorodifluoromethane are introduced in the reactor at the temperature of −80° C. With the same procedure of that utilized in example 1, 500 Nl/h of oxygen, 336 Nl/h of tetrafluoroethylene and 8.4 Ni/h of fluorine (TFE/$F_2$=40 molar ratio) are fed by maintaining the temperature of the reactor an −80° C. and the pressure at 4 absolute bar. After some hours of running one starts to extract a flow of the reaction mixture which is sent to the evaporator, by recycling solvent and $COF_2$ and extracting the polymer so as to maintain constant its concentration in the reactor mixture.

in these running conditions the tetrafluoroethylene concentration in the reaction mixture is not detectable by gaschromatographic analysis. A polymer with a very low PO is obtained and the by-product $COF_2$ which is produced accumulates progressively in the reaction mixture. After 24 hours of running the $COF_2$ concentration in the reaction mixture is equal to 44% molar. The feeding flow-rates are modified as follows: oxygen 400 Nl/h, tetrafluoroethylene 224 Nl/h, fluorine 3.3 Nl/h (TFE/F$_2$ ratio=68); temperature and pressure are maintained at the values indicated above. After a short time TPE is detectable at the gaschromatographic analysis and within a few hours it reaches a concentration equal to 0.5% molar; such concentration is kept for the successive 45 hours of the running. During his period of time the COF$_2$ concentration in the reaction mixture slowly increases up to a final value equal to 60% by moles.

The polymer produced shows a PO of 3.77 and a viscosity at 20° C. equal to 830 cSt; the $^{19}$P-NMR shows a p/q ratio equal to 8.59, a number molecular weight of 9800.

Example 3A (comparative)

In the reactor of example 1, 20 l of dichlorodifluoromethane were introduced at the temperature of −80° C. With the same procedure as that utilized in Example 1, 400 Nl/h of oxygen, 224 Nl/h of tetrafluoroethylene and 4.6 Nl/h of fluorine were fed, by keeping the temperature at −80° C. and the pressure at 4 absolute bar for the whole test, equal 5 hours and 40 minutes. The feeding molar ratio was equal to 48.7.

Unlike the previous examples the plant was carried out in batch, that is the flow of the reaction mixture was not extracted, wherefore the polymer accumulated during the reaction.

The olefin concentration ranged from an initial value of 0.24% by moles to a final concentration of 0.86% by moles and the one of COF$_2$ constantly rose in the time up to a final value of 7.5% by moles.

The polymer reached a final concentration in the reactor equal to 15% by weight. Such polymer showed a PO of 2.72, a number average molecular weight equal to 6150 with p/q ratio=3.41.

We claim:

1. Tetrafluoroethylene oxidation process for preparing peroxidic perfluoropolyoxyalkylene polymers at temperatures between −100° C. and −40° C., in the absence of UV radiation and by operating in the presence of a chemical initiator containing at least one F—X bond, wherein X is oxygen or halogen, by operating with total pressures between 0 and 15 relative bar and in the presence of a solvent comprising an amount of COF$_2$ greater than 8% of total solvent by moles or in the presence of COF$_2$ alone.

2. Tetrafluoroethylene oxidation process in the absence of UV radiation, according to claim 1, wherein the temperature is between −90° and −60° C.

3. Tetrafluoroethylene oxidation process in the absence of UV radiation, according to claim 1, wherein the chemical initiator is chosen from fluorine and alkylic hypofluorites containing up to 3 carbon atoms.

4. Tetrafluoroethylene oxidation process in the absence of UV radiations, according to claim 1, wherein the solvent is selected from linear and cyclic fluorocarbons, optionally containing hydrogen and/or chlorine; perfluoropropane, perfluorocyclobutane, perfluorocyclohexane, chloropentafluoroethane, 1,1,2-trichloro-1,2,2-trifluoroethane, 1,2-dichlorotetrafluoroethane; perfluoroamines and perfluoroethers and polyethers, optionally containing hydrogen.

5. Tetrafluoroethylene oxidation process in the absence of UV radiation, according to claim 4, wherein the solvent is selected from: CFCl$_3$, CF$_2$Cl$_2$, CF$_2$HCl, CF$_3$—CF$_2$H, CF$_3$—CFH$_2$, CF$_2$H—CF$_2$H, CHClF—CF$_3$ and/or CHF$_2$—CClF$_2$ optionally mixed with CHF$_2$—CH$_2$F, CF$_3$CFHCF$_2$CF$_3$, CF$_3$CFHCFHCF$_2$CF$_3$ or azeotropic or near-azeotropic mixtures of two or more of the cited compounds; CH$_3$OCF$_2$CFHCF$_3$, C$_8$F$_{17}$—O—C$_2$F$_4$H, CF$_2$H—O—CF$_2$H, C$_6$F$_{13}$—O—C$_2$F$_4$O—CF$_2$H, C$_8$F$_{17}$—O—CF$_2$H C$_7$F$_{15}$—O—C$_2$F$_4$H, C$_4$F$_9$—O—C$_2$F$_4$H, C$_4$F$_9$OCH$_3$, C$_4$F$_9$OC$_2$H$_5$, C$_3$F$_7$OCH$_3$, C$_3$F$_7$OC$_2$H$_5$, C$_2$F$_5$OCH$_3$, C$_2$F$_5$OC$_2$H$_3$, F(CF$_2$—CF$_2$—CX'$_2$O)$_n$CF$_2$CF$_2$H with X'=F, H and n being an integer from 0 to 4, extremes included, and T—O(C$_3$F$_6$O)$_{p0}$(C$_2$F$_4$O)$_{p0}$(CF$_2$O)$_{r0}$—T' with p0, q0 and r0 being integers from 0 to 3, extremes included, and T and T', equal to or different from each other, selected from CF$_3$, C$_2$F$_5$, C$_3$F$_7$, CF$_2$H and CF$_3$CFH, CF$_2$CF$_2$H, the perfluorooxy-alkylenic units being randomly distributed in the polymeric chain.

6. Tetrafluoroethylene oxidation process in the absence of UV radiation, according to claim 1, wherein the chemical initiator is fed in the liquid phase in amounts between 0.001 and 0.5 moles per hour per liter of liquid phase; the TFE concentration in liquid phase ranges from 0.005 and 1 mole/l of solution.

7. Tetrafluoroethylene oxidation process in the absence of UV radiation, according to claim 6, wherein the feeding molar ratios TFE/chemical initiator are between 10 and 200.

8. Tetrafluoroethylene oxidation process in the absence of UV radiation, according to claim 7, wherein the feeding molar ratios TFE/chemical initiator are between 40–120.

9. Tetrafluoroethylene oxidation process in the absence of LIV radiation, according to claim 1, wherein the amount by moles of COF$_2$ in the solvent is between 15 and 60%.

10. Tetrafluoroethylene oxidation process in the absence of U/V radiation, according to claim 1, wherein COF$_2$ comes from the recycle of COF$_2$ by-product formed in the oxidation reaction.

11. Tetrafluoroethylene oxidation process in the absence of UV radiation, according to claim 1, wherein the obtained peroxidic polymers have the following general formula:

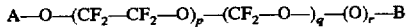

$$A-O-(CF_2-CF_2-O)_p-(CF_2-O-)_q-(O)_r-B$$

wherein the terminals A and B can be equal to or different from each other and comprise —CF$_2$X, —CF$_2$—CF$_2$X, wherein X indicates a radicalic group deriving from the kind of initiator utilized; the p, q and r indexes equal to or different from each other are integers, the sum p+q is an integer between 2 and 1000, the p/q ratio is between 0.1 and 40, the r/(p+q) ratio is between 0.01–0.3.

12. Tetrafluoroethylene oxidation process in the absence of UV radiation, according to claim 11, wherein in the peroxidic polymer p+q is between 10 and 500, the p/q ratio is comprised between 0.2 and 20.

13. Tetrafluoroethylene oxidation process in the absence of UV radiation, according to claim 11, wherein peroxidic perfluoropolyethers are transformed into products without peroxidic oxygen by a thermal treatment at temperatures between 100°–250° C. or by UV radiation in or out of the presence of solvents.

14. Tetrafluoroethylene oxidation process in the absence of UV radiation, according to claim 13, wherein the obtained products without peroxidic oxygen are submitted to fluorination treatment to obtain perfluoropolyether with perfluoroalkylic terminals.

15. Tetrafluoroethylene oxidation process in the absence of UV radiation, according to claim 13, wherein the obtained products are submitted to chemical reduction and to subsequent transformation reactions to obtain products having a functional derivative wherein the functional derivative is in the form of carboxylic acid salt, optionally subjected to decarboxylation processes in the presence of hydrogen-donor substances to obtain perfluoropolyethers having both terminals —OCF$_2$H.

* * * * *